Patented Nov. 8, 1938

UNITED STATES PATENT OFFICE 2,136,333

STABILIZATION OF VINYLIDENE CHLORIDE

Gerald H. Coleman and John W. Zemba, Midland, Mich., assignors to The Dow Chemical Company, Midland, Mich., a corporation of Michigan No Drawing. Application December 1, 1936, Serial No. 113,742

3 Claims. (Cl. 23—250)

This invention relates to the art of stabilizing vinylidene chloride, $H_2C=CCl_2$, and to the improved composition thereby obtained.

When vinylidene chloride is exposed to the action of air and light, a gradual polymerization takes place with the formation of resinous products. The formation of such polymeric compounds is desirable in the preparation of plastics, but it is necessary that the material be stabilized at least temporarily against such polymerization so that it can be stored for a period of time following its preparation, and prior to its use in resin formation. It is, therefore, among the objects of this invention to provide a process for inhibiting the polymerization of vinylidene chloride. A further object of the invention is to provide a relatively stable monomeric vinylidene chloride. Another object of the invention is to provide a stabilized vinylidene chloride composition from which the stabilizing agent can be readily removed when desired.

We have discovered that vinylidene chloride can be stabilized against the action of air and light by incorporating therewith one, or a combination, of certain organic compounds, and furthermore, that these stabilizing agents can be conveniently separated from the vinylidene chloride immediately prior to the polymerization thereof.

The proportion in which such stabilizing agents are incorporated with the vinylidene chloride is dependent upon the length of time for which it is desired to stabilize the vinylidene chloride, and the particular agent employed. While any desired proportions of stabilizing agent may be so employed, the use of up to 10 per cent by weight thereof in the stabilized composition is generally sufficient. The low solubility in vinylidene chloride of many of the stabilizing agents hereinafter described limits the proportions thereof which can effectively be employed to below 1 per cent by weight of the stabilized product.

In determining the effect of various compounds as stabilizers, the material to be tested was added to 10 milliliters, i. e. 12.5 grams, of vinylidene chloride, in a 25 milliliter test tube. The test tube holding such composition was thereafter tightly stoppered and exposed to light at a temperature of 25°–35° C. for the duration of the test in the presence of the air in the tube above the liquid. Each sample was examined to determine the amount of polymerized product present therein, as indicated by the amount of precipitated polymer accumulating in the bottom of the test tube. Controls were run on 10 milliliter samples of unstabilized vinylidene chloride maintained under the conditions above described.

The following table summarizes the results from a number of experiments. When the stabilizing compound had a very low solubility in vinylidene chloride and could not be dissolved therein in any substantial amount, the inhibitor concentration is termed "trace". Where the stabilizing compound was readily miscible with the vinylidene chloride at the concentration tested, but a slight precipitate was formed and subsequently filtered off prior to testing, the inhibitor concentration is stated to be "less than —%".

Table

| Stabilizing agent | Concentration | Time | Results |
|---|---|---|---|
| | Percent | Days | |
| None | | 1 | Test tube half full of white flocculent precipitate. |
| | | 2 | Gelatinous mass. |
| | | 3 | Do. |
| | | 7 | Hard resinous mass. |
| Para-amino-phenol | Trace | 1 | Trace of precipitate. |
| | | 7 | Do. |
| | | 21 | Turbid solution. |
| Hydroxy-azo-benzene | Trace | 21 | Clear solution. |
| Phenol | 7.5 | 60 | Do. |
| | 0.08 | 7 | Do. |
| Ortho-cresol | 7.5 | 60 | Do. |
| | 0.08 | 7 | Do. |
| Ortho-phenylphenol | 7.5 | 60 | Do. |
| | 0.08 | 7 | Do. |
| Ortho-chloro-phenol | 7.5 | 21 | Do. |
| | 0.08 | 7 | Do. |
| Beta-naphthol | Less than 1 | 21 | Do. |
| | 0.08 | 7 | Do. |
| Hydroxy-benzophenone | 7.5 | 2 | Do. |
| | | 7 | Small amount of precipitate. |
| Hydroquinone | Trace | 7 | Clear solution. |
| Tertiarybutyl-catechol | Trace | 7 | Do. |
| Resorcinol | Trace | 14 | Do. |
| Phloroglucinol | Trace | 2 | Do. |
| | | 7 | Slight turbidity. |
| Cyclohexanol | 7.5 | 2 | Clear solution. |
| | | 7 | Test tube approximately one eighth full of precipitate. |
| Methyl salicylate | 7.5 | 2 | Clear solution. |
| | | 7 | Small amount of precipitate. |

In actual practice 2.5 grams of phenol was dissolved in 2 gallons, e. g. 20.75 pounds, of vinylidene chloride and found to prevent the polymerization thereof for at least six months.

Fractional distillation of the stabilized compositions above described served to effect a substantially complete separation of the various stabilizing agents therefrom. In each case the stabilizing agent employed remained as a residue from the distillation and was adapted to be re-employed for the stabilization of additional vinylidene chloride. Vinylidene chloride obtained thereby as a low boiling distillate was found to polymerize readily under the usual conditions.

Other modes of applying the principle of our invention may be employed instead of those explained, change being made as regards the materials employed, provided the step or steps or the products recited in the following claims be thereby carried out or obtained.

We therefore particularly point out and distinctly claim as our invention:—

1. Vinylidene chloride containing up to 10 per cent by weight of an aromatic compound containing at least one hydroxyl group attached to the aromatic nucleus, said hydroxy aromatic compound being present in sufficient quantity to prevent polymerization.

2. Vinylidene chloride containing up to 10 per cent by weight of phenol, said phenol being present in sufficient quantity to prevent polymerization.

3. Vinylidene chloride and up to 10 per cent by weight of a polyhydroxy-benzene compound, said poly-hydroxy benzene compound being present in sufficient quantity to prevent polymerization.

GERALD H. COLEMAN.
JOHN W. ZEMBA.